United States Patent [19]

Baeger et al.

[11] Patent Number: 4,720,704

[45] Date of Patent: Jan. 19, 1988

[54] DISPLAY

[75] Inventors: Holm Baeger, Schwalbach; Hans Wedel, Mühltal, both of Fed. Rep. of Germany

[73] Assignee: VDO Adolf Schindling AG, Frankfurt am Main, Fed. Rep. of Germany

[21] Appl. No.: 687,616

[22] Filed: Dec. 31, 1984

[30] Foreign Application Priority Data

Jan. 9, 1984 [DE] Fed. Rep. of Germany ....... 3400438

[51] Int. Cl.⁴ .............................................. G09G 3/36
[52] U.S. Cl. ..................................... 340/716; 340/765; 340/784
[58] Field of Search ............... 340/716, 719, 753, 755, 340/759, 784, 787, 788, 765; 40/139, 130

[56] References Cited

U.S. PATENT DOCUMENTS

| 4,315,258 | 2/1982 | McKnight et al. | 340/765 |
| 4,376,934 | 3/1983 | Prohaska et al. | 340/753 X |
| 4,403,831 | 9/1983 | Amano | 340/787 X |
| 4,410,887 | 10/1983 | Stolov et al. | 340/765 |
| 4,412,214 | 10/1983 | Tanaka et al. | 340/784 X |
| 4,514,920 | 5/1985 | Shafrir et al. | 340/784 X |
| 4,562,433 | 12/1985 | Biferno | 340/716 |
| 4,563,678 | 1/1986 | Ziegler | 340/716 X |
| 4,567,481 | 1/1986 | Meirer et al. | 340/716 X |

*Primary Examiner*—Gerald L. Brigance
*Attorney, Agent, or Firm*—Martin A. Farber

[57] ABSTRACT

A display for displaying variable and permanent data. It has two support plates 1 and 2 which form between themselves a chamber 3 in which a fluid which can be switched between optically different states is arranged. Polarizers are arranged on the sides of the support plates 1 and 2 which face away from the chamber 3. In the region of permanent data, transparent elements 14 are present between the support plates 1 and 2. Furthermore, a source of light 15 is arranged on the side of the cell facing away from the observer. The variable data consists of bright data against a dark background. The observer's side of the cell is provided with a light-impervious layer 8 which has cutouts 9 and 10 in the region of the variable data as well as in correspondence with the permanent data. A transflective layer is disposed in the cutout region to enable viewing the cutout region and permanent data via incident light.

12 Claims, 2 Drawing Figures

DISPLAY

BACKGROUND OF THE INVENTION

The invention relates to a display for displaying variable and permanent data, particularly liquid crystal cells, having two support plates which form a chamber between themselves, a fluid which can be switched between optically different states being arranged in said chamber, having polarizers arranged on the sides of the support plates facing away from the chamber, having transparent elements arranged between the support plates in the region of the permanent data, and having a source of light arranged on the side of the cell facing away from the observer.

In such known displays, spacers which contrast optically with their background are developed in the shape of the permanent data. By the contrast with the background this permanent data is continuously visible to the observer. Since these spacers are arranged on one of the support plates in a different operation than the image electrodes are in the case of a liquid crystal cell, there may be an inaccurate association between the permanent and variable data due to manufacturing tolerances, particularly in the case of fine structures. In order to avoid this, a higher cost of manufacture must be tolerated.

It is an object of the invention to create a diplay in accordance with the foregoing which can be manufactured in a simple and uncomplicated manner.

SUMMARY OF THE INVENTION

According to the invention, the variable data are bright data on a dark background and the observer side of the cell is provided with a light-impervious layer (8) which has cutouts (9, 10 respectively) in the region of the variable data and in the region corresponding to the permanent data. By this development, an exact association of permanent data with variable data is obtained in simple manner in the manner with their contours are produced in a simple operation by the application of the light-impervious—preferably black—layer with the cutouts. The transparent elements interrupt the optically switchable fluid in the chamber, so that, upon illumination by the light source, the region of the light-impervious layer which faces away from the observer is illuminated in the region of the cutouts of the permanent data, so that these permanent data—for instance scales—light up.

In order to permit the permanent data to light up uniformly, the observer side of the cell can be provided with a transparent layer in the region of the cutouts (10) for the permanent data. If the transparent layer is a transflective layer (7), then the permanent data light up due to the impingement of light from the outside even when the source of light is turned off.

If a plurality of transparent elements of small size is arranged in the region of the permanent data with optically switchable fluid present between them, then the optically switchable fluid can be introduced into the chamber without difficulty by evacuation of the chamber. For this purpose, the display is provided with an inlet opening on its one side and with an evacuation opening on its other side. By connecting the evacuation opening to vacuum and immersing the inlet opening in optically switchable fluid such as, for instance, a liquid-crystal substance, this fluid is drawn into the chamber. If there are a large number of or intricately shaped transparent elements of the fixed data, the proper complete filling of the chamber is possible only with difficulty, if at all. The interrupted structure of the transparent elements of the permanent data permits a dependable, uniform filling of the chamber in all regions. In this way, a simple and nevertheless dependable manufacture of the display is assured.

A two-fold function of the transparent elements is obtained in the manner that the elements are transparent spacer elements (14) bound in adhesive (17). In this way they serve not only for the transmission of light but at the same time also for assuring the correct distance of the two support plates from each other. This is important particularly in the case of large-area displays since an incorrect distance apart in the regions of the variable data otherwise leads to poor, such as colored, presentation of these data.

The spacer elements (14) may preferably be spheres or fibers of glass. By varying the number of spacer elements, variation in the brightness with which the permanent data are lit up can also be attained in simple manner.

Particularly in the case of large-area displays with large inactive surfaces it is advantageous for the transparent spacer elements (14) to be distributed in the entire chamber (3) outside the regions of the variable data. In this way, the support plates are maintained precisely at the correct distance apart in large regions, and no additional operation is required in order to produce illumination for the permanent data, while nevertheless a simple and reliable filling of the chamber with optically switchable fluid is assured.

The transparent spacer elements (14) may, in this case, be distributed in raster-like manner over the plane of the chamber (3), this being done in simple fashion in the manner that the transparent spacer elements (14) are applied by a printing process to one of the support plates (1 or 2, respectively).

BRIEF DESCRIPTION OF THE DRAWING

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
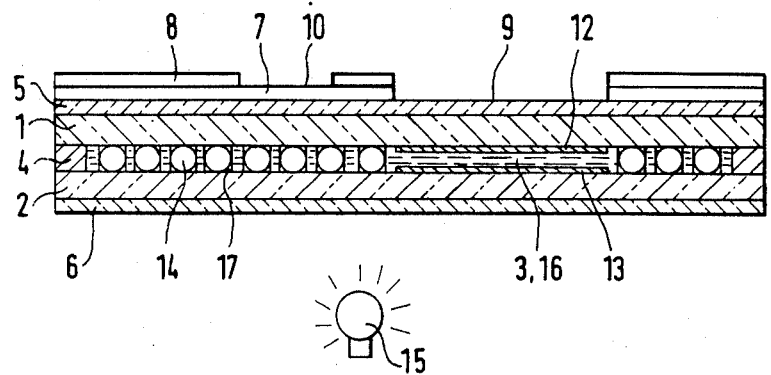
FIG. 1 is a cross section through a display.
Figure 2:
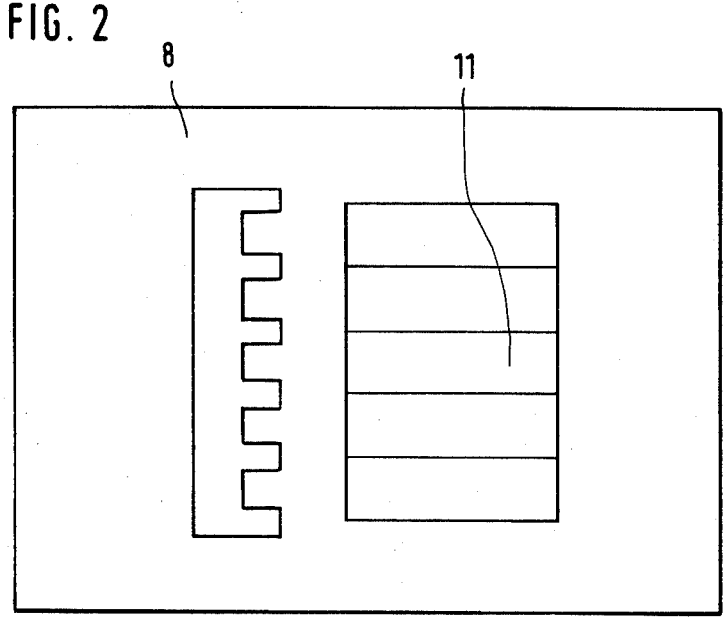
FIG. 2 is a top view of the display of FIG. 1, seen from the observer's side.

The display shown is a liquid-crystal cell having a front transparent support plate 1 and a rear transparent support plate 2, which plates are arranged spaced apart from each other, forming between themselves a chamber 3 which is filled with a liquid-crystal substance 16 and is closed off by a peripheral rim 4.

Polarizers 5 and 6 are arranged on the sides of the support plates 1 and 2 facing away from the chamber 3. The polarizer 5 is provided, except for the region of the variable data, with a transflective layer 7 which is preferably white. This transflective layer 7 is, in its turn, covered by a light-impervious, preferably black, layer 8 which has a cutout 9 in the region of the variable data. There is also a cutout 10 which has the contour of the permanent data—a scale.

The variable data is formed by a bar graph 11, for the optically visible excitation of which electrodes 12 and 13 are arranged on support plates 1 and 2 in the chamber 3.

With the exception of the region of the variable data, transparent spacer elements 14 are, in the other regions of the chamber 3, arranged uniformly distributed, they being bonded in an adhesive 17 and being thus held in position.

In the regions outside the permanent data, the spacer elements 14 serve only to assure the exact distance apart of the two support plates 1 and 2.

In the region of the permanent data, they also serve as light guides which conduct the light from a source of light 15 arranged on the rear of the liquid crystal cell to the cutout 10 and permanently illuminate the latter.

The bar graph 11 is dark when it is in unexcited condition. Only when the electrodes 12 and 13 are excited are its elements illuminated by the source of light 15, depending on the excitation. As used herein, the term "transflective" means partially transparent and partially reflective, and includes translucent material.

It is to be understood that the above-described embodiment of the invention is illustrative only, and that modifications thereof may occur to those skilled in the art. Accordingly the invention is not to be regarded as limited to the embodiment disclosed herein, but is to be limited only as defined by the appended claims.

We claim:

1. In a display having at least one region for displaying variable data and at least one region for displaying permanent data, particularly a liquid crystal cell, said display having two support plates which form a chamber therebetween, and a fluid which can be switched between optically different states being located in said chamber, said display further comprising polarizers positioned on surfaces of the support plates facing away from the chamber, transparent elements being located between the support plates in the region of the permanent data, and a source of light positioned on a back side of the cell facing away from an observer located in front of an observer side of the cell, the improvement wherein the variable data are bright data on a dark background located in a variable-data region; said cell further comprising a light-impervious layer on the observer side of the cell, said light-impervious layer having a first cutout in a region of the variable data and a second cutout in a region corresponding to the permanent data, one of said polarizers being located on the observer side of said chamber; and wherein the observer side of the cell is provided with a transflective layer disposed between said light-impervious layer and said one polarizer in the region of the cutout for the permanent data to enable a viewing of permanent data by light incident upon said observer side of the display and also by light transmitted through the display from a location behind the display.

2. The display according to claim 1, wherein optically switchable fluid is present between a plurality of said transparent elements located in the region of the permanent data.

3. The display according to claim 2, wherein said display further comprises an adhesive; the transparent elements being transparent spacer elements bound in said adhesive.

4. The display according to claim 3, wherein said spacer elements are spheres or fibers of glass.

5. The display according to claim 3, wherein the transparent spacer elements are distributed in the entire chamber outside the regions of the variable data.

6. The display according to claim 5, wherein the transparent spacer elements are distributed uniformly over the plane of the chamber.

7. The display according to claim 6, wherein the transparent spacer elements are applied by a printing process to one of said support plates.

8. In a liquid crystal display having support plates defining a chamber, a liquid which can be switched between optical states disposed in said chamber, and polarizers disposed on surfaces of said support plates facing away from said chamber, the improvement wherein said display further comprises a set of spacers of transparent material disposed within a first portion of said chamber for a display of permanent data; and an electrode structure for optically switching said liquid, said electrode structure being disposed in a second portion of said chamber away from said set of spacers for a display of variable data, one of said polarizers being located on the observer side of said chamber;

a light-impervious layer disposed on the observer side of said one polarizer, said light-impervious layer being located only in a region of the display presenting permanent data and having a cut-out defining the permanent data; and wherein the observer side of the display is provided with a transflective layer disposed between said light-impervious layer and said one polarizer only in the region of the permanent data to enable a viewing of permanent data by light incident upon said observer side of the display and also by light transmitted through the display from a location behind the display while retaining a viewing of the variable data.

9. The liquid crystal display according to claim 8, wherein light emanating behind said display can propagate through said polarizers and said plates and said spacers to the observer side of said display for illuminating the permanent data.

10. The liquid crystal display according to claim 9, further comprising a layer of material on the observer side of said display located at a site of the permanent data and away from a site of the variable data for displaying the permanent data in response to either light incident on the observer side or a back side of said display.

11. The liquid crystal display according to claim 10, wherein said spacers are spaced apart from each other to permit the liquid to pass therebetween to reach said electrode structure.

12. The liquid crystal display according to claim 11, further comprising an optically impervious layer having a first cutout region defining an area of display of the permanent data and a second cutout region defining an area of display of the variable data.

* * * * *